United States Patent
Zhao et al.

(10) Patent No.: US 10,681,479 B2
(45) Date of Patent: Jun. 9, 2020

(54) METHODS, DEVICES AND SYSTEMS FOR BLUETOOTH AUDIO TRANSMISSION

(71) Applicant: CASSIA NETWORKS INC., San Jose, CA (US)

(72) Inventors: Jiamin Zhao, Beijing (CN); Fuyong Zhao, San Jose, CA (US); Kunpeng Zhang, Beijing (CN); Fan Liang, Beijing (CN)

(73) Assignee: CASSIA NETWORKS INC., San Jose ( * ) Notice: Subject to any disclaimer, the term of this patent is extended or adjusted under 35 U.S.C. 154(b) by 0 days.

(21) Appl. No.: 14/919,124

(22) Filed: Oct. 21, 2015

(65) Prior Publication Data
US 2016/0227319 A1   Aug. 4, 2016

Related U.S. Application Data

(63) Continuation-in-part of application No. 14/789,614, filed on Jul. 1, 2015, now Pat. No. 9,730,003, and a continuation-in-part of application No. 14/639,711, filed on Mar. 5, 2015, now Pat. No. 9,769,594.

(60) Provisional application No. 62/187,956, filed on Jul. 2, 2015, provisional application No. 62/110,250, filed on Jan. 30, 2015, provisional application No. 62/110,262, filed on Jan. 30, 2015.

(51) Int. Cl.
*H04R 27/00* (2006.01)
*H04W 4/80* (2018.01)

(52) U.S. Cl.
CPC .............. *H04R 27/00* (2013.01); *H04W 4/80* (2018.02); *H04R 2227/003* (2013.01); *H04R 2227/005* (2013.01); *H04R 2420/07* (2013.01); *H04R 2430/01* (2013.01)

(58) Field of Classification Search
CPC .... H04R 27/00; H04R 2227/003; H04W 4/80
USPC .............................. 455/41.2, 114.2; 343/861
See application file for complete search history.

(56) References Cited

U.S. PATENT DOCUMENTS 5,408,197 A   4/1995 Miyake
5,513,382 A   4/1996 Agahi-Kesheh
(Continued)

FOREIGN PATENT DOCUMENTS

CA   2749659   2/2012
CN   101026406   8/2007
(Continued)

OTHER PUBLICATIONS

International Search Report and Written Opinion for Application No. PCT/US2016/015617, dated Apr. 21, 2016, 17 pages.
(Continued)

*Primary Examiner* — Edward F Urban
*Assistant Examiner* — Rui M Hu

(57) ABSTRACT

A device for providing audio data to a plurality of Bluetooth audio devices is provided. The device includes one or more Bluetooth transceivers for communicating with the plurality of Bluetooth audio devices, at least one network interface, one or more processors, and a memory for storing instructions executable by the one or more processors. The one or more processors may be configured to receive the audio data via the at least one network interface, decode the audio data for audio playing, and transmit the decoded audio data to the plurality of Bluetooth audio devices via the one or more Bluetooth transceivers.

14 Claims, 11 Drawing Sheets

(56) References Cited

U.S. PATENT DOCUMENTS

| | | | |
|---|---|---|---|
| 5,521,561 A | 5/1996 | Yrjola | |
| 5,689,817 A | 11/1997 | Fok | |
| 6,054,896 A | 4/2000 | Wright | |
| 6,097,703 A | 8/2000 | Larsen | |
| 6,236,622 B1* | 5/2001 | Blackman | G04B 47/00 362/253 |
| 6,404,386 B1 | 6/2002 | Proctor | |
| 6,681,100 B1 | 1/2004 | Ge | |
| 6,957,047 B1 | 10/2005 | Young et al. | |
| 7,363,003 B2 | 4/2008 | Takatani et al. | |
| 7,961,689 B2 | 6/2011 | Stratford | |
| 8,219,026 B2 | 7/2012 | Naik et al. | |
| 8,433,242 B2 | 4/2013 | Kenington et al. | |
| 8,976,724 B2 | 3/2015 | Hauser et al. | |
| 9,264,907 B2 | 2/2016 | Laroia | |
| 9,730,003 B2 | 8/2017 | Gu et al. | |
| 9,769,594 B2 | 9/2017 | Zhang et al. | |
| 9,960,834 B2 | 5/2018 | Zhang et al. | |
| 9,986,495 B2 | 5/2018 | Gu et al. | |
| 9,990,790 B2 | 6/2018 | Petel et al. | |
| 10,178,494 B2 | 1/2019 | Zhao et al. | |
| 10,225,098 B2 | 3/2019 | Gu et al. | |
| 2001/0012757 A1 | 8/2001 | Boyle | |
| 2001/0014911 A1 | 8/2001 | Doi | |
| 2002/0028655 A1 | 3/2002 | Rosener | |
| 2002/0072329 A1 | 6/2002 | Bandeira et al. | |
| 2003/0095524 A1 | 5/2003 | Stephens et al. | |
| 2003/0214437 A1 | 11/2003 | Rawnick | |
| 2005/0070329 A1 | 3/2005 | Lection | |
| 2005/0088980 A1 | 4/2005 | Olkkonen | |
| 2005/0212708 A1 | 9/2005 | Fifield | |
| 2005/0248962 A1* | 11/2005 | Searfoss, III | A61B 5/00 362/642 |
| 2007/0041344 A1 | 2/2007 | Yaqub | |
| 2007/0188358 A1 | 8/2007 | Somayajula | |
| 2007/0222697 A1 | 9/2007 | Caimi | |
| 2008/0043996 A1 | 2/2008 | Dolph et al. | |
| 2008/0318549 A1 | 12/2008 | Skubic et al. | |
| 2009/0011726 A1 | 1/2009 | Nishimura | |
| 2009/0023499 A1 | 1/2009 | Mao | |
| 2009/0063703 A1* | 3/2009 | Finkelstein | G06F 16/4393 709/240 |
| 2009/0147884 A1 | 6/2009 | Sridharan | |
| 2009/0253373 A1 | 10/2009 | Gorbachov | |
| 2009/0303387 A1 | 12/2009 | Chen et al. | |
| 2010/0015919 A1 | 1/2010 | Tian | |
| 2010/0048131 A1 | 2/2010 | Hirsch et al. | |
| 2010/0103316 A1 | 4/2010 | Colsey | |
| 2010/0121891 A1* | 5/2010 | Zampiello | G06F 16/4387 707/822 |
| 2010/0302979 A1 | 12/2010 | Reunamaki | |
| 2010/0303244 A1* | 12/2010 | Kim | H04H 20/33 381/2 |
| 2010/0315225 A1 | 12/2010 | Teague | |
| 2011/0021142 A1 | 1/2011 | Desai | |
| 2011/0028093 A1 | 2/2011 | Patel | |
| 2011/0066850 A1 | 3/2011 | Ekberg | |
| 2011/0117842 A1 | 5/2011 | Hong | |
| 2011/0131520 A1* | 6/2011 | Al-Shaykh | H04L 12/2807 715/772 |
| 2011/0142413 A1* | 6/2011 | Kang | A61B 5/165 386/234 |
| 2011/0215971 A1 | 9/2011 | Rao | |
| 2011/0249596 A1 | 10/2011 | Ross | |
| 2012/0052802 A1 | 3/2012 | Kasslin et al. | |
| 2012/0057518 A1 | 3/2012 | Herrala | |
| 2012/0116548 A1 | 5/2012 | Goree | |
| 2012/0165006 A1 | 6/2012 | Ge et al. | |
| 2012/0200774 A1* | 8/2012 | Ehlers, Sr. | H04N 21/4104 348/515 |
| 2012/0326942 A1 | 12/2012 | Simmons | |
| 2012/0329395 A1 | 12/2012 | Husted et al. | |
| 2013/0007831 A1* | 1/2013 | Wu | H04N 21/23655 725/116 |
| 2013/0017816 A1 | 1/2013 | Talty | |
| 2013/0033996 A1 | 2/2013 | Song | |
| 2013/0045684 A1* | 2/2013 | Linde | H04W 80/02 455/41.2 |
| 2013/0048734 A1 | 2/2013 | Bianconi et al. | |
| 2013/0148020 A1 | 6/2013 | Cook et al. | |
| 2013/0154897 A1 | 6/2013 | Sorensen | |
| 2013/0254159 A1* | 9/2013 | Thramann | G06F 17/30053 707/609 |
| 2013/0337739 A1 | 12/2013 | Bernsen et al. | |
| 2014/0006947 A1* | 1/2014 | Garmark | G06F 3/0484 715/716 |
| 2014/0041038 A1 | 2/2014 | Lessin et al. | |
| 2014/0066062 A1 | 3/2014 | Chen et al. | |
| 2014/0073244 A1 | 3/2014 | Ko et al. | |
| 2014/0105054 A1 | 4/2014 | Saegrov | |
| 2014/0119407 A1 | 5/2014 | Miller | |
| 2014/0169569 A1* | 6/2014 | Toivanen | H04R 5/04 381/17 |
| 2014/0169599 A1 | 6/2014 | Solum | |
| 2014/0181656 A1* | 6/2014 | Kumar | H04L 12/6418 715/716 |
| 2014/0181683 A1 | 6/2014 | Lim | |
| 2014/0207489 A1 | 7/2014 | Wartena | |
| 2014/0213189 A1 | 7/2014 | Kim et al. | |
| 2014/0213197 A1 | 7/2014 | An | |
| 2014/0287704 A1 | 9/2014 | Dupuy | |
| 2014/0327578 A1 | 11/2014 | Rowson et al. | |
| 2014/0342670 A1 | 11/2014 | Kang et al. | |
| 2014/0370811 A1 | 12/2014 | Kang | |
| 2015/0002425 A1 | 1/2015 | Lee et al. | |
| 2015/0004913 A1 | 1/2015 | Linde et al. | |
| 2015/0026746 A1* | 1/2015 | Fondberg | H04L 65/4084 725/112 |
| 2015/0031288 A1* | 1/2015 | Tubbesing | H04W 4/008 455/41.1 |
| 2015/0039269 A1 | 2/2015 | Mejagard et al. | |
| 2015/0095170 A1* | 4/2015 | Lang | G06Q 20/20 705/16 |
| 2015/0105022 A1 | 4/2015 | Jung | |
| 2015/0105880 A1 | 4/2015 | Slupik | |
| 2015/0128194 A1* | 5/2015 | Kuang | H04N 21/41407 725/81 |
| 2015/0234372 A1 | 8/2015 | Slupik | |
| 2015/0245182 A1 | 8/2015 | Scagnol et al. | |
| 2015/0278215 A1 | 10/2015 | Lee | |
| 2015/0296020 A1 | 10/2015 | Granqvist et al. | |
| 2015/0319046 A1 | 11/2015 | Plummer et al. | |
| 2015/0351145 A1 | 12/2015 | Burks | |
| 2015/0382436 A1 | 12/2015 | Kelly et al. | |
| 2016/0063778 A1 | 3/2016 | Bruns | |
| 2016/0088424 A1 | 3/2016 | Polo et al. | |
| 2016/0095060 A1 | 3/2016 | Seddighrad et al. | |
| 2016/0119438 A1* | 4/2016 | Abramson | H04N 21/41407 709/217 |
| 2016/0065295 A1 | 5/2016 | Stanescu | |
| 2016/0147506 A1 | 5/2016 | Britt et al. | |
| 2016/0154392 A1* | 6/2016 | Jo | H04W 4/001 700/12 |
| 2016/0157048 A1 | 6/2016 | Kerai | |
| 2016/0217672 A1 | 7/2016 | Yoon et al. | |
| 2016/0258617 A1* | 9/2016 | Wang | F21V 33/0056 |
| 2016/0278011 A1 | 9/2016 | Tomida | |
| 2017/0004692 A1 | 1/2017 | Britt et al. | |
| 2017/0065295 A1 | 3/2017 | Patel et al. | |
| 2017/0099597 A1 | 4/2017 | Choi et al. | |
| 2017/0127304 A1 | 5/2017 | Britt et al. | |
| 2017/0201854 A1 | 7/2017 | Choi et al. | |
| 2017/0215030 A1 | 7/2017 | Choi et al. | |
| 2017/0272166 A1 | 9/2017 | Albrecht et al. | |
| 2017/0353979 A1 | 12/2017 | Lee et al. | |
| 2019/0260660 A1 | 8/2019 | Abuan et al. | |

FOREIGN PATENT DOCUMENTS

| | | |
|---|---|---|
| CN | 102882567 | 1/2013 |
| JP | 2004-506983 A | 3/2004 |
| JP | 2004-272376 A | 9/2004 |

(56) References Cited

FOREIGN PATENT DOCUMENTS

| | | |
|---|---|---|
| JP | 2009-060163 A | 3/2009 |
| JP | 2011-524101 A | 8/2011 |
| JP | 2012-500590 A | 1/2012 |
| JP | 2013-529423 A | 7/2013 |
| JP | 2013-258672 A | 12/2013 |
| JP | 2014-519236 A | 8/2014 |
| JP | 2015-008368 A | 1/2015 |
| JP | 2017-511028 A | 4/2017 |
| KR | 10-0818511 B1 | 3/2008 |
| WO | 2007033194 | 3/2007 |
| WO | 2012150534 | 11/2012 |
| WO | 2013086036 | 6/2013 |
| WO | 2014082665 A1 | 6/2014 |

OTHER PUBLICATIONS

Final Office Action for U.S. Appl. No. 14/789,614, dated Oct. 14, 2016, 16 pages.
Non-Final Office Action for U.S. Appl. No. 14/930,307, dated Oct. 20, 2016, 15 pages.
Final Office Action for U.S. Appl. No. 15/450,534, dated Sep. 8, 2017, 10 pages.
Final Office Action for U.S. Appl. No. 15/276,424, dated Sep. 22, 2017, 14 pages.
Non- Final Office Action for U.S. Appl. No. 15/276,424, dated Mar. 24, 2017, 14 pages.
International Application No. PCT/US2016/015105, International Preliminary Report on Patentability dated Aug. 1, 2017.
International Application No. PCT/US2016/015124, International Preliminary Report on Patentability dated Aug. 1, 2017.
International Application No. PCT/US2016/015617, International Preliminary Report on Patentability dated Aug. 1, 2017.
Non-Final Office Action for U.S. Appl. No. 15/450,534, dated Apr. 7, 2017, 8 pages.
International Application No. PCT/US2016/015124, International Search Report and Written Opinion dated May 26, 2016.
International Application No. PCT/US2016/015105, International Search Report and Written Opinion dated Jun. 3, 2016.
Partial Search Report for European Application No. 16744028.8, dated on Jul. 25, 2018, 16 pages.
Partial Search Report for European Application No. 16744033.8, dated on Jul. 27, 2018, 15 pages.
First Office Action for Chinese Application No. 201510329041.X, dated Jul. 31, 2018, with Search Report, 7 pages.
Non-Final Office Action for US Appl. No. 15/693,568, dated on Aug. 9, 2018, 16 pages.
Extended Search Report for European Application No. 16744028.8 dated Oct. 31, 2018.
Extended Search Report for European Application No. 16744033.8 dated Nov. 9, 2018.
Non-Final Office Action for U.S. Appl. No. 14/930,307, dated Feb. 23, 2018, 14 pages.
Non-Final Office Action for U.S. Appl. No. 15/276,424, dated May 17, 2018, 14 pages.
Final Office Action dated Apr. 4, 2019, issued in related U.S. Appl. No. 15/693,568, 12 pages.
Final Office Action dated Dec. 30, 2016, issued in related to U.S. Appl. No. 14/639,711, 14 pages.
Notice of Allowance dated May 19, 2017, issued in related U.S. Appl. No. 14/639,711, 11 pages.
Notice of Allowance dated Jul. 11, 2018, issued in related U.S. Appl. No. 14/930,307, 7 pages.
Notice of Allowance dated Mar. 16, 2018, issued in related U.S. Appl. No. 15/450,534, 7 pages.
Notice of Allowance dated Mar. 28, 2017, issued in related U.S. Appl. No. 14/789,614, 6 pages.
Notice of Allowance dated Apr. 20, 2018, issued in related U.S. Appl. No. 15/633,826, 23 pages.
Non-Final Office Action dated May 3, 2018, issued in related to U.S. Appl. No. 15/615,391, 13 pages.
Notice of Allowance dated Oct. 19, 2018, issued in related U.S. Appl. No. 15/615,391, 8 pages.
Second Office Action dated Apr. 1, 2019, issued in related Chinese Application No. 201510329041.X, 8 pages.
Non-Final Office Action dated Jun. 17, 2016, issued in related U.S. Appl. No. 14/639,711, 14 pages.
International Application No. PCT/US2017/036141, International Search report and Written Opinion dated Sep. 1, 2017.
Non-Final Office Action dated May 27, 2016, issued in related U.S. Appl. No. 14/789,614, 16 pages.
Final Office Action dated May 25, 2017, issued in related U.S. Appl. No. 14/930,307, 18 pages.
Notice of Reasons for Rejection dated Oct. 29, 2019, issued in related Japanese Patent Application No. 2017-534352, with English machine translation (11 pages).
Notice of Reasons for Refusal dated Oct. 8, 2019, issued in related Japanese Patent Application No. 2017-534348, with English machine translation (8 pages).
Notice of Reasons for Rejection dated Jan. 21, 2020, issued in related Japanese Patent Application No. 2017-534348, with English machine translation (7 pages).

\* cited by examiner

METHODS, DEVICES AND SYSTEMS FOR BLUETOOTH AUDIO TRANSMISSION

CROSS REFERENCE TO RELATED APPLICATIONS

This application is based on and claims priority to U.S. Provisional Application No. 62/187,956, filed Jul. 2, 2015, entitled "METHODS, DEVICES AND SYSTEMS FOR BLUETOOTH AUDIO TRANSMISSION." This application is also a continuation-in-part application of application Ser. No. 14/639,711, titled "METHODS, DEVICES AND SYSTEMS FOR INCREASING WIRELESS COMMUNICATION RANGE," filed Mar. 5, 2015, which is based upon and claims the benefit of priority from Provisional Application No. 62/110,250, titled "METHODS, DEVICES AND SYSTEMS FOR INCREASING WIRELESS COMMUNICATION RANGE," filed on Jan. 30, 2015, and Provisional Application No. 62/110,262, titled "BLUETOOTH TRANSPARENT RELAY," filed on Jan. 30, 2015. This application is also a continuation-in-part application of application Ser. No. 14/789,614, titled "METHODS, DEVICES AND SYSTEMS FOR SUPPORTING WIRELESS COMMUNICATION," filed Jul. 1, 2015, which is based upon and claims the benefit of priority from Provisional Application No. 62/110,250, titled "METHODS, DEVICES AND SYSTEMS FOR INCREASING WIRELESS COMMUNICATION RANGE," filed on Jan. 30, 2015, and Provisional Application No. 62/110,262, titled "BLUETOOTH TRANSPARENT RELAY," filed on Jan. 30, 2015. The entire contents of the above-referenced U.S. patent applications including U.S. application Ser. Nos. 14/639,711, 14/789,614, 62/110,250, 62/110,262, and 62/187,956 are incorporated herein by reference.

TECHNICAL FIELD

This disclosure relates generally to the field of Bluetooth communication and, more particularly, to methods, devices, and systems for Bluetooth audio transmission.

BACKGROUND

Bluetooth devices such as Bluetooth speakers, smart phones, smart locks, have become widely used in many applications. Conventionally, a Bluetooth enabled client device, such as a smart phone, may communicate to a Bluetooth device, such as a Bluetooth speaker or headset, within a short communication range, typically less than ten meters inside an indoor area. If a wall is located between the Bluetooth device and the client device, generally the Bluetooth transmission does not penetrate the wall, and as a result, communication may not be established between the Bluetooth device and the client device.

At a given time instant, a Bluetooth device may be controlled by a single client device and may not be controlled by multiple client devices simultaneously. For the Bluetooth device to switch from a current controlling client device to another controlling client device, a user associated with the current controlling client device may need to terminate the connection between the current controlling client device and the Bluetooth device, such that another client device may be paired to the Bluetooth device subsequently to gain control of the Bluetooth device. Moreover, where multiple Bluetooth devices are present and each of the devices is associated with a separate application interface, a user of the client device may have to start multiple different applications in order to control the multiple Bluetooth devices.

Thus, it is desirable to extend the communication range of Bluetooth devices without having to increase the transmission power or production cost of the Bluetooth devices. Further, it is desirable to allow multiple client devices to control the Bluetooth devices simultaneously and, in the meantime, provide a unified application interface for a user to manage the Bluetooth devices.

SUMMARY

The present disclosure provides a device for providing audio data to a plurality of Bluetooth audio devices. Consistent with some embodiments, the device includes one or more Bluetooth transceivers for communicating with the plurality of Bluetooth audio devices, at least one network interface, one or more processors, and a memory for storing instructions executable by the one or more processors. The one or more processors may be configured to receive the audio data via the at least one network interface, decode the audio data for audio playing, and transmit the decoded audio data to the plurality of Bluetooth audio devices via the one or more Bluetooth transceivers.

Consistent with some embodiments, this disclosure provides a method for providing audio data to a plurality of Bluetooth audio devices. The method includes receiving the audio data via at least one network interface, decoding the audio data for audio playing, and transmitting the decoded audio data to the plurality of Bluetooth audio devices via one or more Bluetooth transceivers.

Consistent with some embodiments, this disclosure provides another device for providing audio data to a plurality of Bluetooth audio devices. The device includes one or more Bluetooth transceivers for communicating with the plurality of Bluetooth audio devices, an antenna, a radio frequency (RF) front end system communicatively coupled to the transceiver and the antenna, at least one network interface, one or more processors, and a memory for storing instructions executable by the one or more processors. The RF front end system includes a RF sampling block coupled to the one or more Bluetooth transceivers and configured to sample signals received from the one or more Bluetooth transceivers and output voltage signals, a RF switching logic coupled to the RF sampling block to receive the voltage signals and configured to switch the RF front end system between a transmitting mode and a receiving mode, a RF transmission gain block coupled to the RF switching logic and configured to increase a transmission power of the signals received from the one or more Bluetooth transceivers, and a RF receiving gain block coupled to the RF switching logic and configured to suppress noise signals contained in radio frequency signals received from the antenna. The one or more processors may be configured to receive the audio data via the at least one network interface, decode the audio data for audio playing, and transmit the decoded audio data to the plurality of Bluetooth audio devices via the one or more Bluetooth transceivers.

Consistent with some embodiments, this disclosure provides another device for providing audio data to a plurality of Bluetooth audio devices. The device includes a configurable antenna system including a plurality of antenna elements, one or more Bluetooth transceivers for communicating with the plurality of Bluetooth audio devices, an antenna logic system communicatively coupled to the one or more Bluetooth transceivers and the configurable antenna system, at least one network interface, one or more processors, and a memory for storing instructions executable by the one or more processors. Each of the antenna elements may be capable of being turned on or off to produce different antenna configurations. The one or more Bluetooth transceivers may be configured to generate a received signal strength indicator (RSSI) for each of the antenna configurations. The RSSI may be generated based on signals received from a client device. The antenna logic system may be configured to receive, from the one or more Bluetooth transceivers, the RSSI for each of the antenna configurations, select an antenna configuration among the antenna configurations based on the RSSI, and configure the configurable antenna system with the selected antenna configuration. The one or more processors may be configured to receive the audio data via the at least one network interface, decode the audio data for audio playing, and transmit the decoded audio data to the plurality of Bluetooth audio devices via the one or more Bluetooth transceivers.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. It is intended that the following detailed description be considered as exemplary only, with the true scope and spirit being indicated by the following claims.

The illustrated components and steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 1:
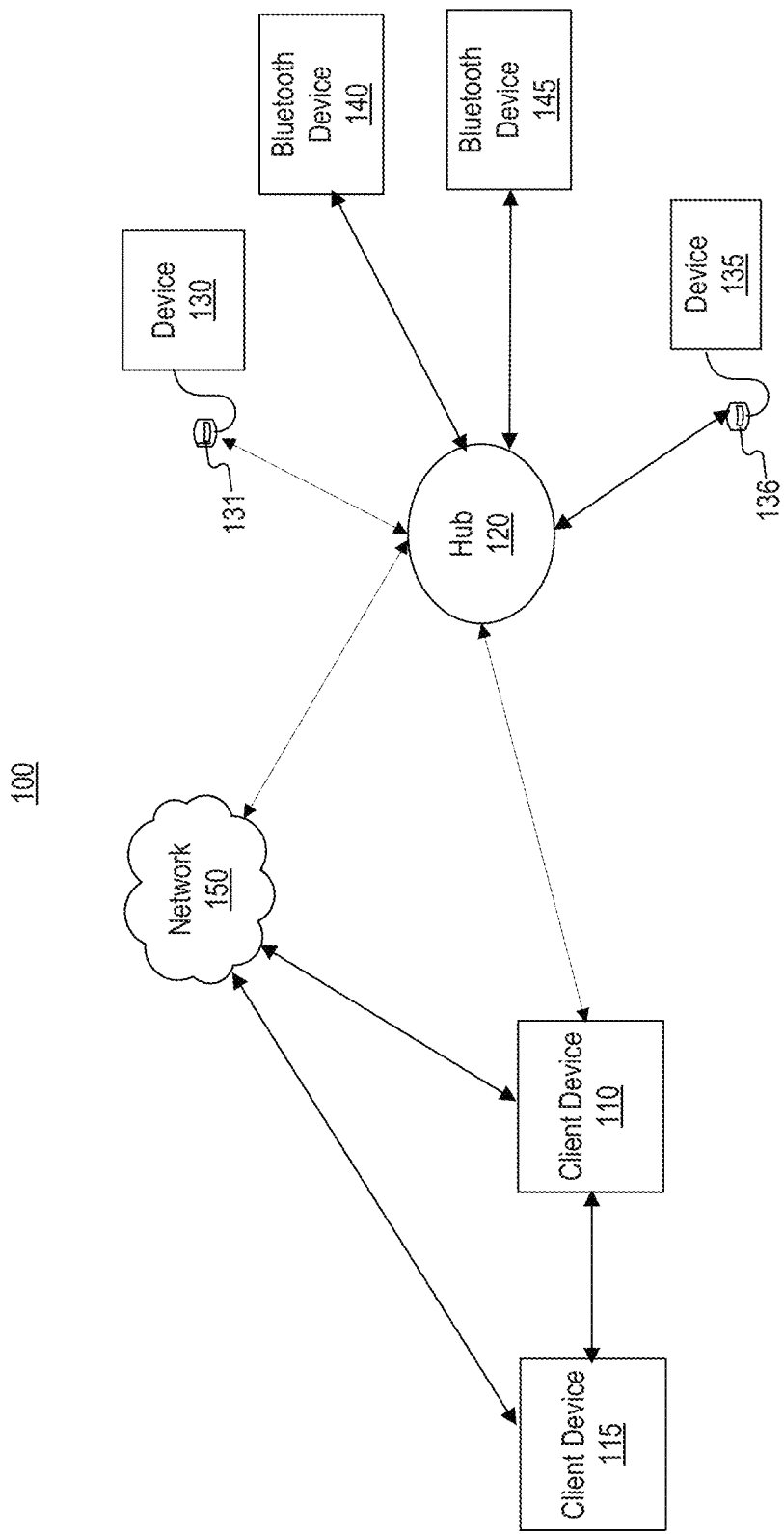
FIG. 1 illustrates an exemplary system environment for implementing methods and systems consistent with the present disclosure.

FIG. 1 illustrates an exemplary system environment 100 for implementing methods and systems consistent with the present disclosure. The system environment 100 shown in FIG. 1 includes client devices 110 and 115, a hub 120, non-Bluetooth devices 130 and 135, Bluetooth adapters 131 and 136 attached to non-Bluetooth devices 130 and 135 respectively, Bluetooth devices 140 and 145, and a network 150. In the present disclosure, a client device refers to an electronic device provided with a user interface for a user of the client device to perform access or control of a Bluetooth device. The client device may be a smart phone, a tablet, a computer, a laptop, a smart watch, a TV, or other electronic devices with screens and operating systems. In some embodiments, the client device may be configured with a Bluetooth interface that allows the client device to transmit or receive Bluetooth signals. In other embodiments, the client device may not be configured with a Bluetooth interface and may not be capable to transmit or receive Bluetooth signals. The Bluetooth devices 140 and 145 may be speakers, headsets, microphones, lights, printers, smart watches, cameras, TVs, monitors, wearable devices including wristbands, pedometers, activity trackers, sleep trackers, weight scales, etc. The non-Bluetooth devices 130 and 135 may be any types of the electronic devices mentioned above except that the non-Bluetooth devices do not include an internal Bluetooth communication interface. The system environment 100 may also include more or less number of Bluetooth devices, non-Bluetooth devices, or client devices than those shown in FIG. 1.

As shown in FIG. 1, the client device 110 may be connected to the hub 120 through a wireless communication link. For example, the client device 110 may be a Bluetooth-enabled client device that communicates to the hub 120 using Bluetooth communication protocol. The client device 110 may also communicate to the hub 120 using other wireless communication protocol, e.g., ZigBee, WiFi, etc. When communication is to be established between a Bluetooth-enabled client device and a Bluetooth device, the hub 120 may receive radio signal from the Bluetooth-enabled client device (e.g., client device 110), process the received signal, and send corresponding radio signal to the Bluetooth device (e.g., Bluetooth device 145), such that communication may be established through the hub 120. The hub 120 may also be called as a router, and in this disclosure, the terms of hub and router are intended to be inter-exchangeable.

In some embodiments, the hub 120 may also support communication between a Bluetooth-enabled client device and a non-Bluetooth device. For example, a Bluetooth adapter (e.g., Bluetooth adapter 136) may be attached to the non-Bluetooth device (e.g., device 135), and the hub 120 may send and/or receive Bluetooth signals to the non-Bluetooth device through the Bluetooth adapter. For example, the Bluetooth adapter may be connected to a non-Bluetooth device, such as a non-Bluetooth speaker or headset, and enable the non-Bluetooth device to receive Bluetooth signals from a Bluetooth-enabled client device via the hub 120.

In some embodiments, the hub 120 may be used to increase the communication range between a Bluetooth-enabled client device and a Bluetooth device. For example, the hub 120 may be implemented with smart antennas and/or smart front end systems to extend the Bluetooth communication range. Methods and systems for implementing the hub 120 are described in U.S. Provisional Application No. 62/110,250, filed Jan. 30, 2015, entitled "METHODS, DEVICES AND SYSTEMS FOR INCREASING WIRELESS COMMUNICATION RANGE," and U.S. Provisional Application No. 62/110,262, filed Jan. 30, 2015, entitled "BLUETOOTH TRANSPARENT RELAY," the entire contents of all of which are incorporated herein by reference.

In some embodiments, the client devices may communicate with the hub 120 through a network 150. For example, as shown in FIG. 1, the client device 115 may remotely communicate with the hub 120 and/or other client devices via the network 150. The network 150 may be any type of network that provides communications, exchanges information, and/or facilitates the exchange of information between the hub 120 and client devices. In one embodiment, the network 150 may be the Internet, a Local Area Network, a cellular communication network, a wireless local area network, or other suitable connections that allow the client devices to send and receive information to/from the hub 120. In some embodiments, the network 150 may include a remote cloud-based network system that can be accessed by both the client device 115 and the hub 120. For example, the client device 115 may control the hub 120 through a cloud server by using a smart phone application. As another example, the hub 120 may be configured to connect to the Internet via the network 150 and perform online audio and/or music streaming according to a request received from the client device 115 via the network 150.

In the following description, Bluetooth protocols and devices are used to illustrate the design of the hub 120. It should be understood, however, that similar constructions of the wireless hub can be applied to scenarios where other wireless communication protocols are used without departing from the spirit and scope of the present disclosure.

Figure 2:
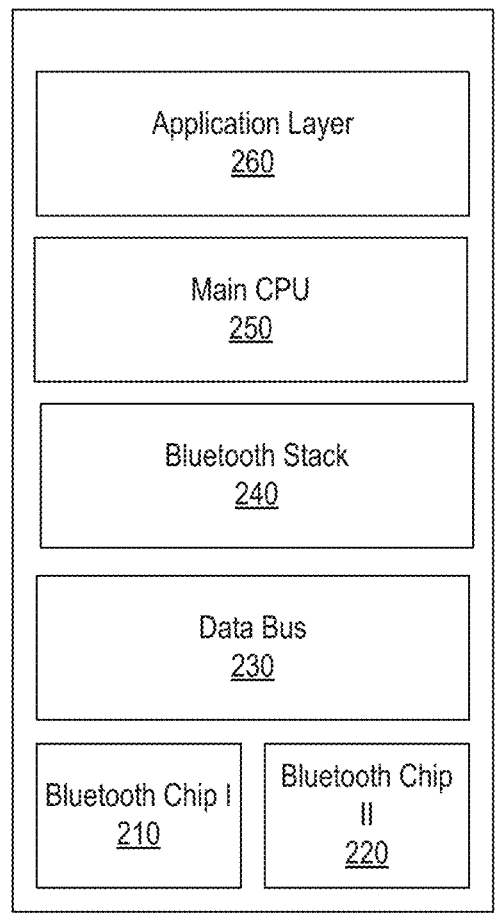
FIG. 2 illustrates an exemplary block diagram of a Bluetooth hub, in accordance with an embodiment of the present disclosure.

FIG. 2 illustrates an exemplary architecture of a Bluetooth hub 200, in accordance with an embodiment of the present disclosure. As shown in FIG. 2, the Bluetooth hub 200 may include two Bluetooth chips 210 and 220, a data bus 230, a Bluetooth stack 240, a main CPU 250, and an application layer 260. The Bluetooth hub may also include more or less number of Bluetooth chips than those shown in FIG. 2.

The Bluetooth chips 210 and 220 may each include a Bluetooth transceiver and be configured to communicate with Bluetooth devices, such as Bluetooth devices 140 and 145, and Bluetooth adapters 131 and 136. In some embodiments, each of the Bluetooth chips 210 and 220 may include one or more audio connections that can be used to output audio data. Each of the audio connections may be configured to output same or different audio data at a given time instant, so as to produce the desired sound effect. In some implementations, a sound server may be implemented in the Bluetooth hub 200 to route audio data to an appropriate Bluetooth audio device. The sound server may accept sound input from one or more sources and redirecting it to an appropriate Bluetooth audio device. For example, the Bluetooth hub 200 may include PulseAudio or other types of sound server.

The CPU 250 may be configured to execute instructions associated with operations of the Bluetooth hub 200. Additionally, the CPU 250 may execute certain instructions and commands to provide wireless communication, using the Bluetooth chips 210 and 220. The Bluetooth stack 240 may implement functionalities provided in the Bluetooth protocol. For example, the Bluetooth stack 240 may implement the scanning, pairing, and connection functions to establish a Bluetooth connection. The Bluetooth stack 250 may interact with the data bus 230 and/or the Bluetooth chips 210 and 220, and provide data output to the main CPU 240 and/or the application layer 260. The application layer 260 may be used for interacting with and managing end-user applications.

In some implementations, the Bluetooth stack 240 may include software programs designed to facilitate multimedia audio streaming from the Bluetooth hub 200 to a Bluetooth device, such as a Bluetooth speaker or headset. For example, the Bluetooth stack 240 may include Advanced Audio Distribution Profile (A2DP) that allows Bluetooth audio streaming from a Bluetooth enabled client device to a Bluetooth speaker or headset. As another example, the Bluetooth stack 240 may include Audio/Video Distribution Transport Protocol (AVDTP) protocol that specifies the transport protocol for audio and video distribution and streaming over the Bluetooth air interface. As another example, the Bluetooth stack 240 may include Audio/Video Remote Control Profile (AVRCP) protocol that allows a user to control media playback from Bluetooth audio devices, such as Bluetooth speakers or headsets.

In some implementations, the application layer 260 may include a media player used to decode audio and/or video files, such as open source media player MPlayer, window media player, or the like. For example, the hub 200 may perform online music streaming via the network 150 and the media player may be used for playing the audio files downloaded from the Internet.

The Bluetooth hub 200 may also include other auxiliary components, such as random access memory (RAM), read only memory (ROM), secondary storage (for example, a hard disk drive or flash memory). One skilled in the art will readily appreciate that various other components can also be included in the Bluetooth hub 200.

The Bluetooth hub 200 may communicate with a client device, such as a smart phone, on the application layer level, and communicate with the Bluetooth devices on the link layer level. For example, the Bluetooth hub 200 may communicate with a smart phone using WiFi, Bluetooth, or other communication protocols. When communicating with the Bluetooth devices, the Bluetooth hub 200 may operate as a master device that initiates an outgoing connection request to one of the Bluetooth devices that serve as slave devices.

A person having ordinary skill in the art should appreciate that the above described Bluetooth hub 200 can be modified to apply to scenarios where other wireless communication protocols are used. For example, the Bluetooth chips 210 and 220 and Bluetooth stack 240 in FIG. 2 may be replaced by chips and protocol stack of other wireless communication protocols, such as WIFI, and the resulting hub 200 would be capable of supporting communications between devices using other wireless communication protocols.

Figure 3:
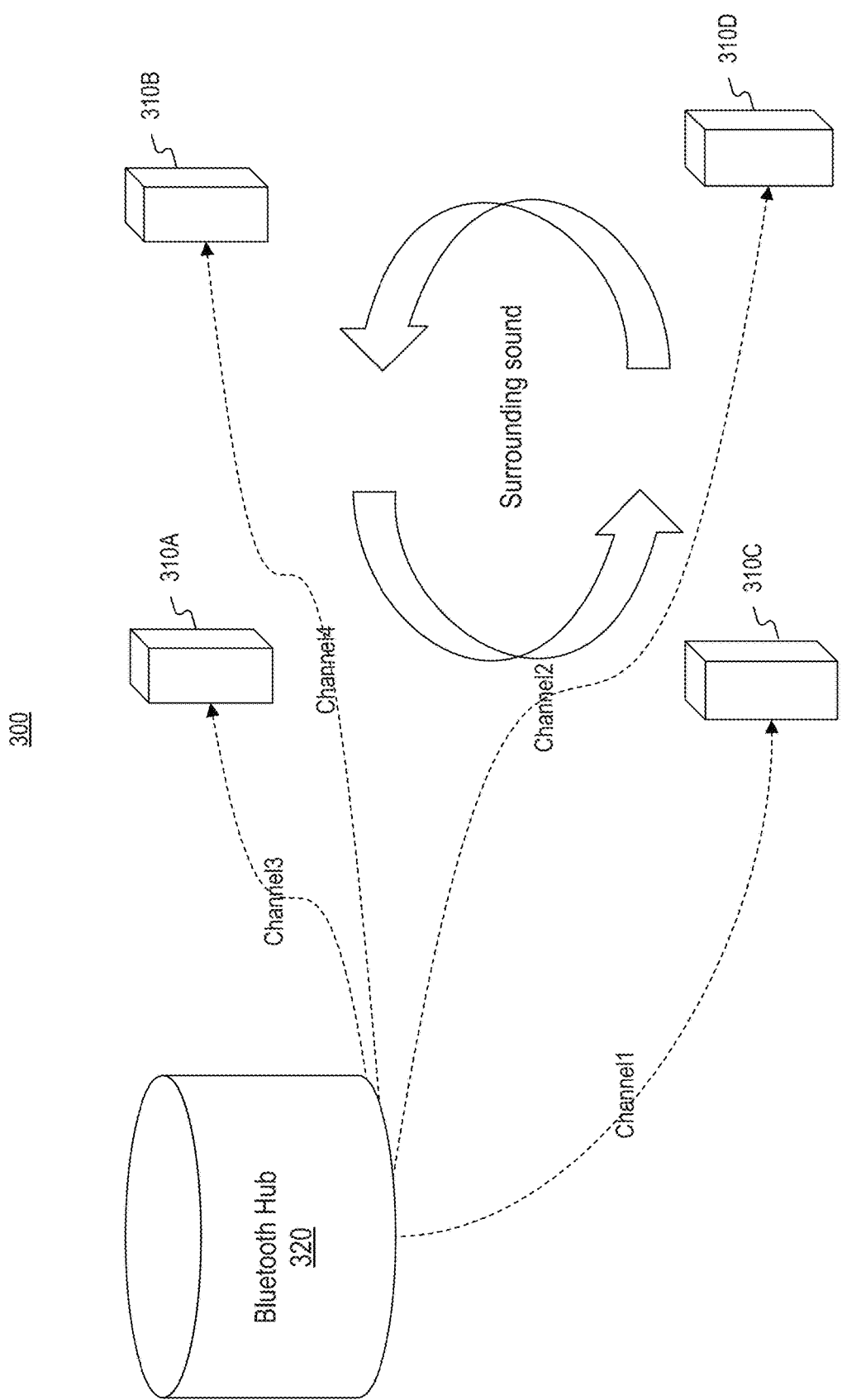
FIG. 3 illustrates an exemplary diagram of a method for producing surrounding sound by a Bluetooth hub, in accordance with an embodiment of the present disclosure.

FIG. 3 illustrates an exemplary diagram 300 of a method for producing surrounding sound by a Bluetooth hub, in accordance with an embodiment of the present disclosure. As shown in FIG. 3, the Bluetooth hub 320 is configured to split the music stream into multiple audio channels and transmit the audio channels to respective Bluetooth speakers 310A-310D to create a surrounding sound effect. As an example, Bluetooth speakers 310A-310D may be scattered at different corners of an indoor area. In this example, the music stream is split into four channels, where channel 1 is transmitted to Bluetooth speaker 310C, channel 2 is transmitted to Bluetooth speaker 310D, channel 3 is transmitted to Bluetooth speaker 310A, and channel 4 is transmitted to Bluetooth speaker 310B. In some implementations, a non-Bluetooth speaker may be used to receive the audio channel from the Bluetooth hub 320 by attaching a Bluetooth audio adapter to the non-Bluetooth speaker.

In some embodiments, the Bluetooth hub 320 may also be configured to communicate with Bluetooth light to change the color and brightness of the bulbs so as to create a particular mood effect. For example, the Bluetooth hub 320 may be configured to change the color of the Bluetooth lights based on the beat of the music that is being played.

In some embodiments, the Bluetooth hub 320 may receive the audio data from a Bluetooth enabled client device, such as a smart phone, a tablet or a computer that supports Bluetooth. For example, the audio data may be stored locally at the Bluetooth enabled client device, and the Bluetooth hub 320 may receive the audio data from the Bluetooth enabled client device via a Bluetooth air interface.

In other embodiments, the Bluetooth hub 320 may receive audio data by online music streaming. For example, the Bluetooth hub 320 may connect to music service sites on the Internet, stream music from the music service sites, and transmit audio signals to various Bluetooth speakers and/or Bluetooth headsets. Further, a user may select the music service site which the Bluetooth hub 320 streams music from by controlling the setting of the Bluetooth hub 320, for example, via a cloud-based server or via a direct connection with the Bluetooth hub using a Bluetooth enabled client device. The Bluetooth hub 320 may be subject to control of multiple users simultaneously. For example, user A may select a music service site for the Bluetooth hub 320 to stream online music, and subsequently user B may change the selected music service site by changing the setting of the Bluetooth hub 320 via a cloud-based server associated with the Bluetooth hub.

As shown in FIG. 3, the Bluetooth hub 320 may be configured to transmit different audio channels to different Bluetooth speakers. In some implementations, the Bluetooth hub 320 may be configured to transmit the same audio signal to various Bluetooth audio devices, such as Bluetooth speakers and/or Bluetooth headsets. For example, the Bluetooth hub 320 may be configured to transmit the same audio signal to various Bluetooth speakers located in different rooms of a house such that the same music is played in the entire house. In other implementations, the Bluetooth hub 320 may be configured to transmit different audio signal to various Bluetooth audio devices at the same time. For example, the Bluetooth hub 320 may be configured to transmit a piece of dancing music to a Bluetooth speaker located in the entertainment room and simultaneously transmit a piece of classical music to another Bluetooth speaker located in the bedroom.

The Bluetooth hub 320 may be connected to the Bluetooth speakers 310A-310D by performing a Bluetooth pairing procedure, which allows a Bluetooth slave device (e.g., the Bluetooth speaker) to be paired with a Bluetooth master device (e.g., the Bluetooth hub). Once a pairing procedure is completed, the paring information may be stored in the Bluetooth hub 320 and/or in a cloud-based server, and no additional pairing may be required in future to establish communication between the Bluetooth hub and the Bluetooth speakers.

In some embodiments, a user of the Bluetooth hub may share control of a Bluetooth audio device with another user. For example, a user may share control of a Bluetooth speaker with another user such that the other user may change the music played by the Bluetooth hub remotely through the cloud-based server associated with the Bluetooth hub.

In some embodiments, the Bluetooth hub 320 may be configured with a music playing mode for transmitting a particular combination of music and lighting control to the Bluetooth devices. For example, the Bluetooth hub 320 may be configured with a wake-up mode, which gradually increases volume of the corresponding Bluetooth speaker and intensity of the corresponding Bluetooth lighting. As another example, the Bluetooth hub 320 may be configured with a sleep mode, which gradually decreases volume of the corresponding Bluetooth speaker and intensity of the corresponding Bluetooth lighting. As another example, the Bluetooth hub 320 may be configured to play different types of music based on weather, user's mood, or the like. Other examples of applications of the Bluetooth hub include leaving a voice mail that is to be played via the Bluetooth speaker, playing online Karaoke television (KTV), and so on.

In some embodiments, an application may be installed on a client device, such as a smart phone, to manage operations of the Bluetooth hub and Bluetooth devices paired with the Bluetooth hub. During initial set up of the Bluetooth hub, a user may use the application to configure a WiFi network for the Bluetooth hub, and the Bluetooth hub may be configured to automatically scan available Bluetooth devices within its communication range. In some implementations, the Bluetooth hub may be configured to scan for only Bluetooth audio devices and LED lights nearby, and to ignore the other types of Bluetooth devices even if they are detected.

Figure 4:
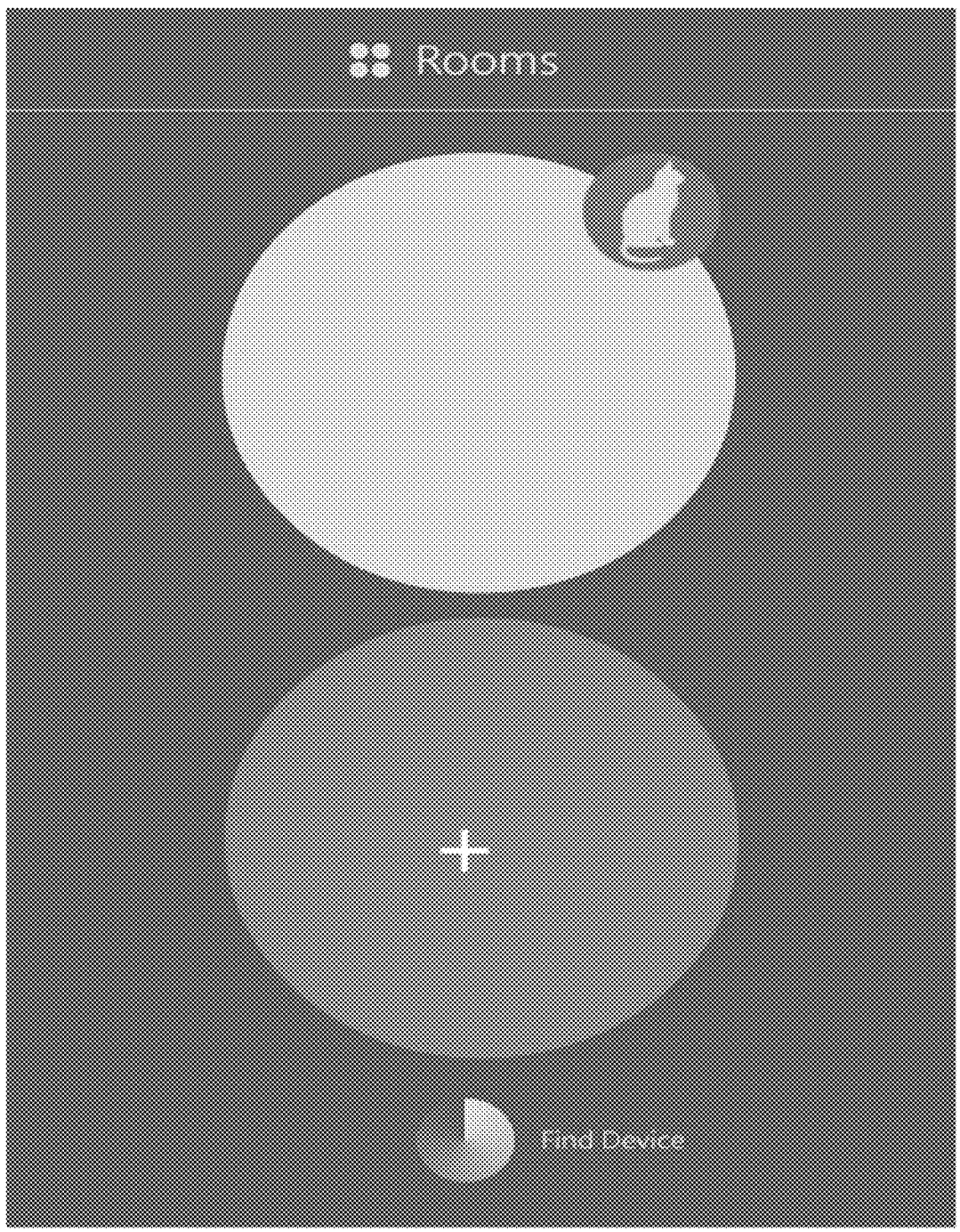
FIG. 4 illustrates an exemplary diagram of a user interface for managing Bluetooth devices, in accordance with an embodiment of the present disclosure.

FIG. 4 illustrates an exemplary diagram 400 of a user interface for managing Bluetooth devices, in accordance with an embodiment of the present disclosure. For example, the user interface may be displayed in a client device when an application associated with the Bluetooth hub is started. In some embodiments, the Bluetooth audio devices may be divided into different groups, and the same audio signal may be transmitted from the Bluetooth hub to the Bluetooth audio devices in the same group. As shown in FIG. 4, the default setting of the Bluetooth hub may include a single group represented by a circle on the user interface, and when a user drags the icon representing the Bluetooth audio device to the plus sign on the user interface, a new group may be created.

Figure 5:
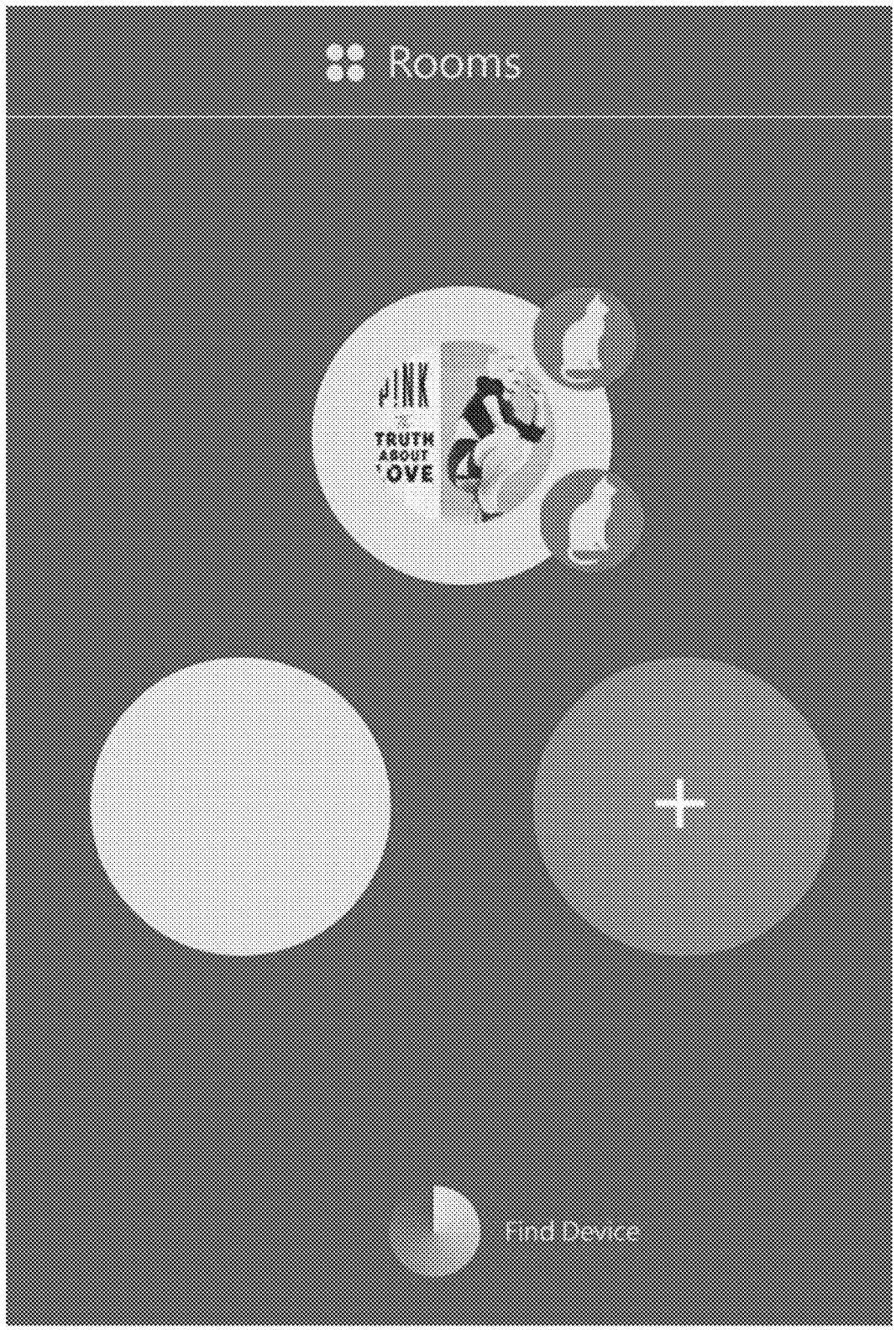
FIG. 5 illustrates another exemplary diagram of a user interface for managing Bluetooth devices, in accordance with an embodiment of the present disclosure.

FIG. 5 illustrates another exemplary diagram 500 of a user interface for managing Bluetooth devices, in accordance with an embodiment of the present disclosure. As shown in FIG. 5, a new group is created as a result of the user's input. It can be seen that there are a total of two groups of Bluetooth audio devices associated with the Bluetooth hub, represented by the two circles on the user interface. The first group contains two Bluetooth audio devices, as indicated by the number of icons representing the Bluetooth audio devices displayed next to the circle on the top of the diagram. The second group contains zero Bluetooth audio devices, as there are no icons representing the Bluetooth audio devices displayed next to or within the circle representing the second group. In some implementations, if no Bluetooth audio devices are present in a group for a predetermined time period, the group may be removed and may be disappeared from the user interface. In some embodiments, a maximum number of groups may be configured for the Bluetooth hub, and once the maximum number is reached, a user may not be able to create new groups unless one or more existing groups are removed.

Figure 6:
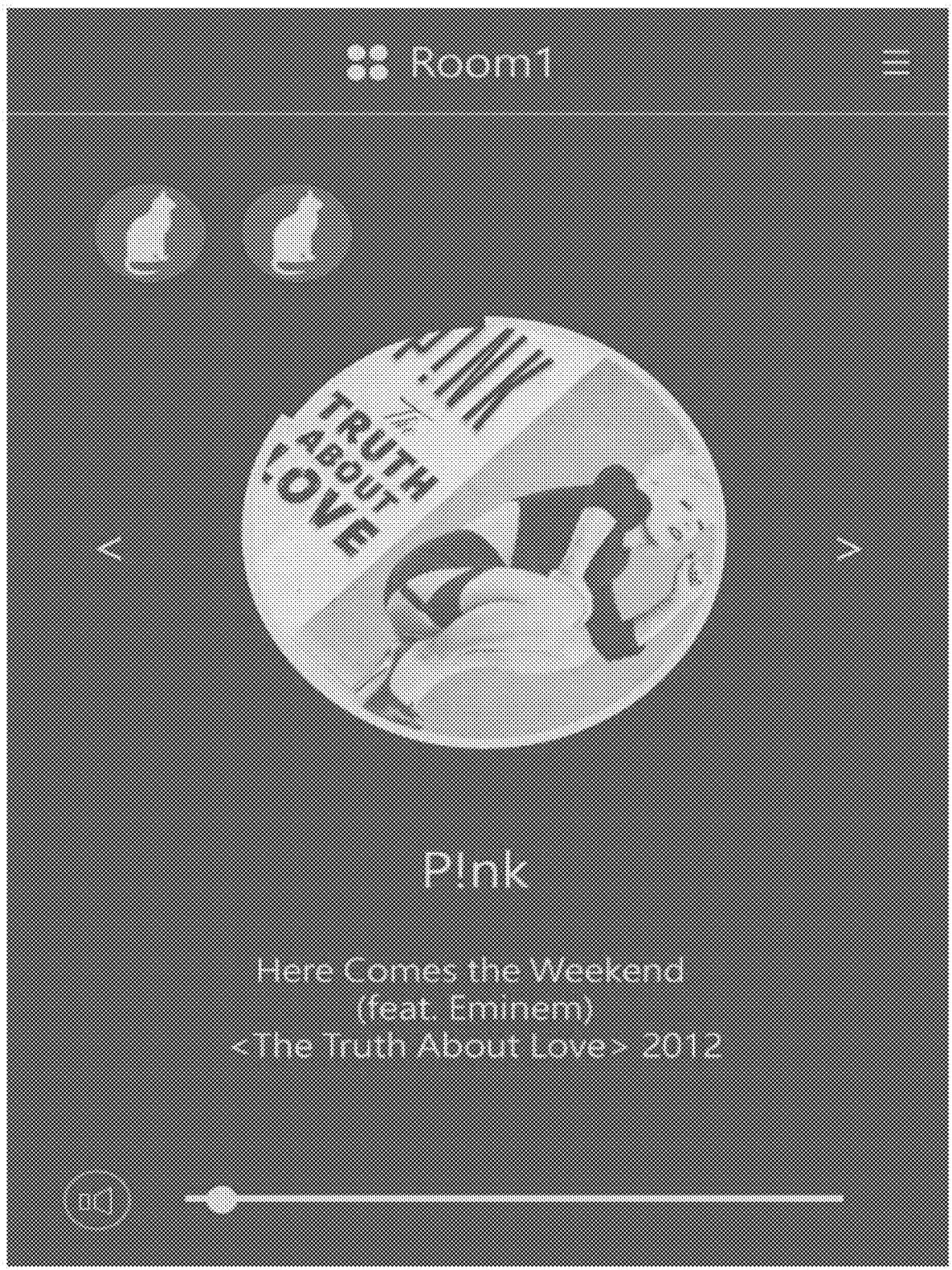
FIG. 6 illustrates an exemplary diagram of a user interface for playing music with a Bluetooth device, in accordance with an embodiment of the present disclosure.

FIG. 6 illustrates an exemplary diagram 600 of a user interface for playing music with a Bluetooth device, in accordance with an embodiment of the present disclosure. For example, the song titled "Here Comes the Weekend" is being transmitted to the two Bluetooth audio devices in group 1 for playing. The user interface displays the title of the song, the title of the album, the artist performing the song, and the play progress of the song. In some implementations, the color of the background in the user interface may be set to indicate the play progress of the song. The user interface may include a selectable element for the user to switch to the next song or the previous song, such as the right arrow icon and left arrow icon shown in the diagram 600. In some implementations, the song may be paused by tapping or clicking the album cover shown in the user interface. There may also be a volume icon shown in the user interface for the user to adjust the volume of the song played by the Bluetooth audio devices. When multiple Bluetooth audio devices are playing the song simultaneously, the volume icon may be expanded upon the user's selection such that the volume of each Bluetooth audio devices may be adjusted individually. If the song is retrieved from an online music service site which allows the user to express like or dislike of the song, an icon may be displayed on the user interface such that the user may tap or click the icon to add the song to the favorites list or to remove the song from future play list. Multiple modes may be supported by the application associated with the Bluetooth hub, including sequential mode, shuffle mode, repeat mode, one song repeating mode, or the like.

Figure 7:
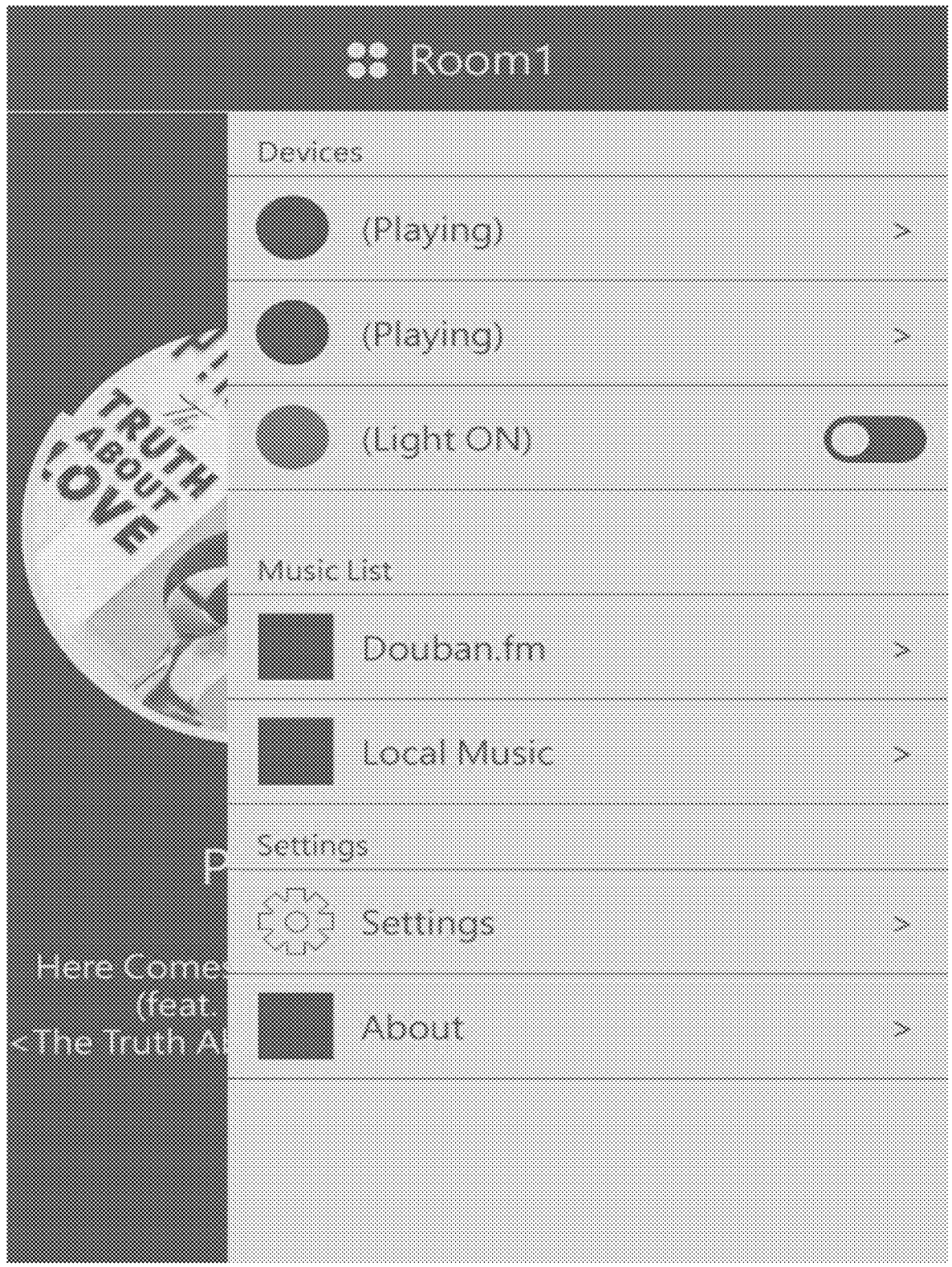
FIG. 7 illustrates an exemplary diagram of a user interface for controlling Bluetooth devices, in accordance with an embodiment of the present disclosure.

FIG. 7 illustrates an exemplary diagram 700 of a user interface for controlling Bluetooth devices, in accordance with an embodiment of the present disclosure. As shown in FIG. 7, multiple sections may be included in the user interface. The user interface may include a list of Bluetooth devices in a group. For example, group 1 includes two Bluetooth audio devices and one Bluetooth LED light. The user interface allows the user to check current status of the Bluetooth devices. For example, if the Bluetooth device is an audio device, by selecting the Bluetooth device, the user interface may display the current status of the Bluetooth device as playing, deactivated, or muted. As another example, if the Bluetooth device is a LED light, by selecting the Bluetooth device, the user interface may display the current status of the Bluetooth device as light on or light off.

Another section included in the user interface may include general setting of the Bluetooth devices. For example, the general setting section may allow a user to select and/or change icons used to represent the Bluetooth devices, to activate or deactivate a particular Bluetooth device, to test the function of the Bluetooth devices, and so on. In the test mode, if the Bluetooth device is an audio device and is selected, a test sound may be generated by the Bluetooth device. If the Bluetooth device is a LED light and is selected for testing, the LED light may start flashing to indicate a normal operation status.

The user interface may also include a section to adjust the setting of each Bluetooth device individually. For example, for a Bluetooth audio device, the device setting may allow the user to adjust the volume of the audio device. As another example, for a Bluetooth LED light, the device setting may allow the user to adjust the intensity of the light in a sliding bar, adjust the color of the light by a color palette, or the like. Further, an automatic theme may be set for the Bluetooth LED light, such that the Bluetooth LED light may flash based on the music currently played by the Bluetooth audio device. For example, the Bluetooth LED light may identify the genre of the music based on the tag provided by the application programming interface (API) associated with the music, and set the theme based on the genre of the music. As another example, the Bluetooth LED light may adjust its color and brightness based on the rhythm of the music, such as using warm color and changing the color rapidly for fast rhythm, using cold color and changing the color slowly for slow rhythm, or the like. A customized theme may also be set for the Bluetooth LED light, where a predefined light color setting and/or flashing mode may be defined by the user in advance for a predefined theme, such as jazz, rock, and so on.

Figure 8:
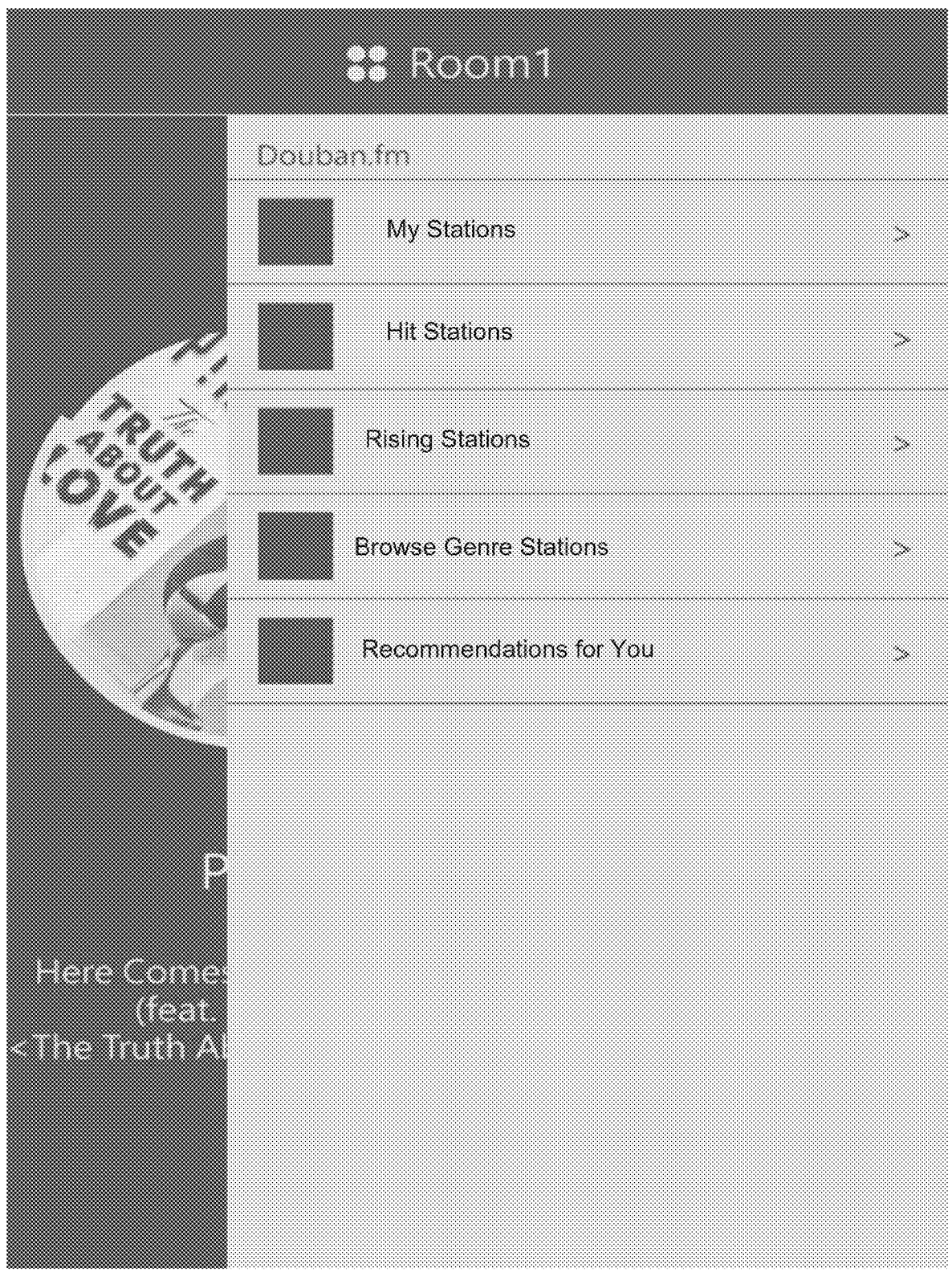
FIG. 8 illustrates an exemplary diagram of a user interface for selecting music to be played by a Bluetooth device, in accordance with an embodiment of the present disclosure.

FIG. 8 illustrates an exemplary diagram 800 of a user interface for selecting music to be played by a Bluetooth device, in accordance with an embodiment of the present disclosure. As described above, the Bluetooth hub may play music stored in a Bluetooth enabled client device or perform online music streaming using Internet music service sites. In this example, the music source is from an Internet music service site "Douban.fm." As shown in FIG. 8, the music listed in the Internet music service site is displayed in the user interface for the user to select music to be played by a Bluetooth device. If a user selects a link of a particular category of the music, the music in that category may be expanded in the user interface. A right arrow may be displayed in the user interface to indicate that the category or list may be expanded upon selection. If a link of a particular category of the music is not expandable, the music in that category may be played upon user selection of the link.

In some embodiments, if a user has set its user account in the Bluetooth hub for accessing the Internet music service site, the Bluetooth hub may access the music in the Internet music service site using the user's account. If a user account has not been set in the Bluetooth hub for accessing the Internet music service site, the Bluetooth hub may send a message to the client device and cause a prompt message to be displayed on the client device. The prompt message may request the user to enter user account information for accessing the Internet music service site, and after the user account information is entered, the information may be stored in the Bluetooth hub.

In some embodiments, when music is being played in one or more Bluetooth audio devices, and an incoming call is received by the client device, the Bluetooth hub may reduce the volume of the Bluetooth audio devices until the call is terminated. Further, in some embodiments, the Bluetooth audio devices in all the groups may be configured to play the same music synchronously. If the user selects another group and/or another song for playing, the synchronous playing by the Bluetooth audio devices may be terminated.

Figure 9:
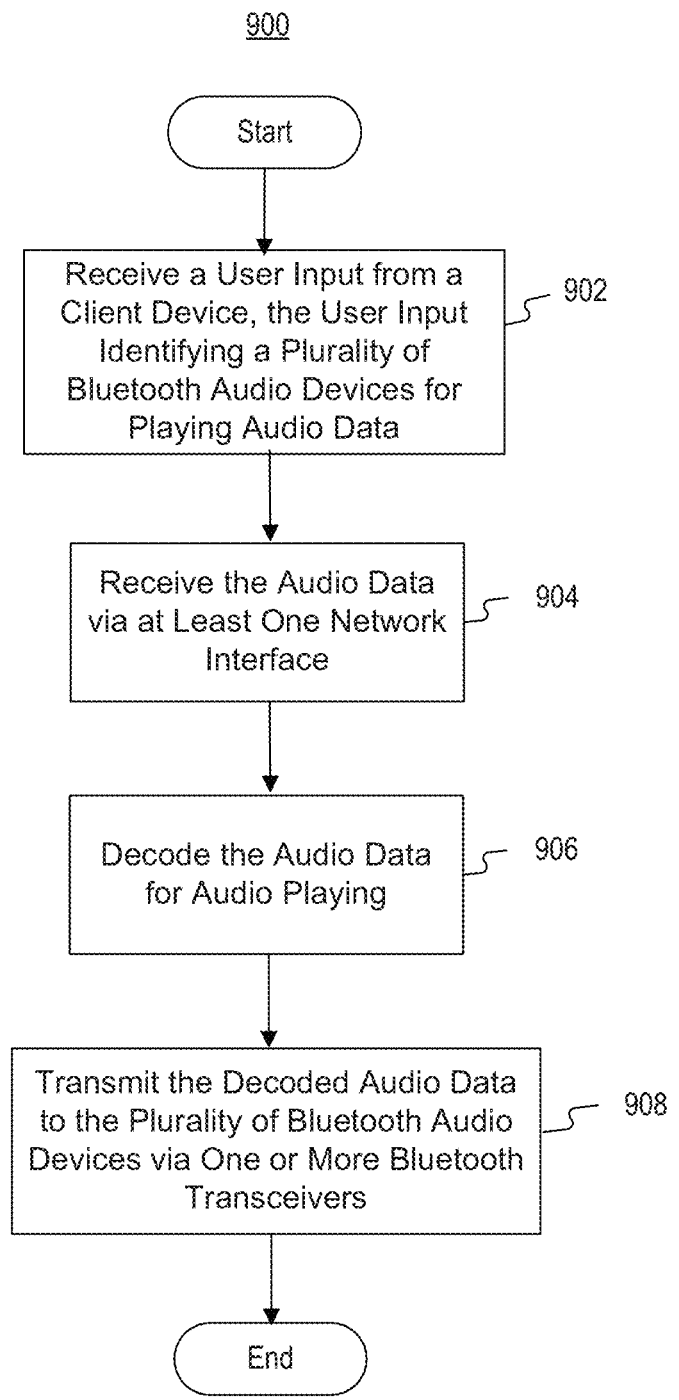
FIG. 9 is a flowchart of an exemplary method for providing audio data to a plurality of Bluetooth devices, in accordance with an embodiment of the present disclosure.

FIG. 9 is a flowchart of an exemplary method 900 for providing audio data to a plurality of Bluetooth devices, in accordance with an embodiment of the present disclosure. The method 900 may be performed by the Bluetooth hub 200 described above in connection with FIG. 2.

At step 902, the Bluetooth hub receives a user input from a client device, where the user input identifies a plurality of Bluetooth audio devices for playing audio data. For example, the Bluetooth hub may receive the user input from a network (e.g., network 150), via a network interface. As another example, the client device may be a Bluetooth-enabled client device (e.g., client device 110), and the Bluetooth hub may receive the user input from the client device via one or more Bluetooth transceivers. In some embodiments, the client device may provide a user interface for a user to select a group of Bluetooth audio devices for playing the audio data. For example, as illustrated in FIG. 6, the client device may provide a user interface that allows a user to select a room to play the audio data, where the room may contain a group of Bluetooth audio devices.

At step 904, the Bluetooth hub receives the audio data via at least one network interface. For example, the Bluetooth hub may receive the audio data from the Internet by performing online audio and/or music streaming. As another example, the Bluetooth hub may receive the audio data by accessing a remote cloud-based network system. In other embodiments, the Bluetooth hub may receive the audio data from a Bluetooth-enabled client device via one or more Bluetooth transceivers.

At step 906, the Bluetooth hub decodes the audio data for audio playing. For example, a media player may be implemented in the Bluetooth hub to decode audio and/or video files.

At step 908, the Bluetooth hub transmits the decoded audio data to the plurality of Bluetooth audio devices via the one or more Bluetooth transceivers. In some embodiments, the same decoded audio data may be transmitted to the plurality of Bluetooth audio devices, such that the plurality of Bluetooth audio devices may play the decoded audio data at substantially the same time. In other embodiments, different decoded audio data may be transmitted to each of the plurality of Bluetooth audio devices to produce a surrounding sound effect, which will be described in more details in connection with FIG. 11.

In some embodiments, the Bluetooth hub may receive a user input identifying an audio playing mode associated with the audio data. For example, the user input received in step 902 may also identify an audio playing mode associated with the audio data. As another example, a separate user input from that in step 902 may be received to identify an audio playing mode.

In some embodiments, the identified audio playing mode may be a sleep mode. In response, the Bluetooth hub may cause a volume of each of the plurality of Bluetooth audio devices to decrease gradually, for example, by sending one or more volume control commands to the Bluetooth audio devices. In other embodiments, the identified audio playing mode may be a wake-up mode. In response, the Bluetooth hub may cause a volume of each of the plurality of Bluetooth audio devices to increase gradually, for example, by sending one or more volume control commands to the Bluetooth audio devices.

In some embodiments, the Bluetooth hub may receive a user input identifying a theme associated with the audio data, such that a particular mood effect may be created by the Bluetooth hub. For example, the user input received in step 902 may also identify a theme associated with the audio data. As another example, a separate user input from that in step 902 may be received to identify a theme. In response to the theme identified in the user input, the Bluetooth hub may adjust, based on the theme, a light intensity and/or a color of a plurality of Bluetooth lighting devices via the one or more Bluetooth transceivers. For example, the Bluetooth hub may change the color of the Bluetooth lighting devices based on the beat of the music that is being played.

Figure 10:
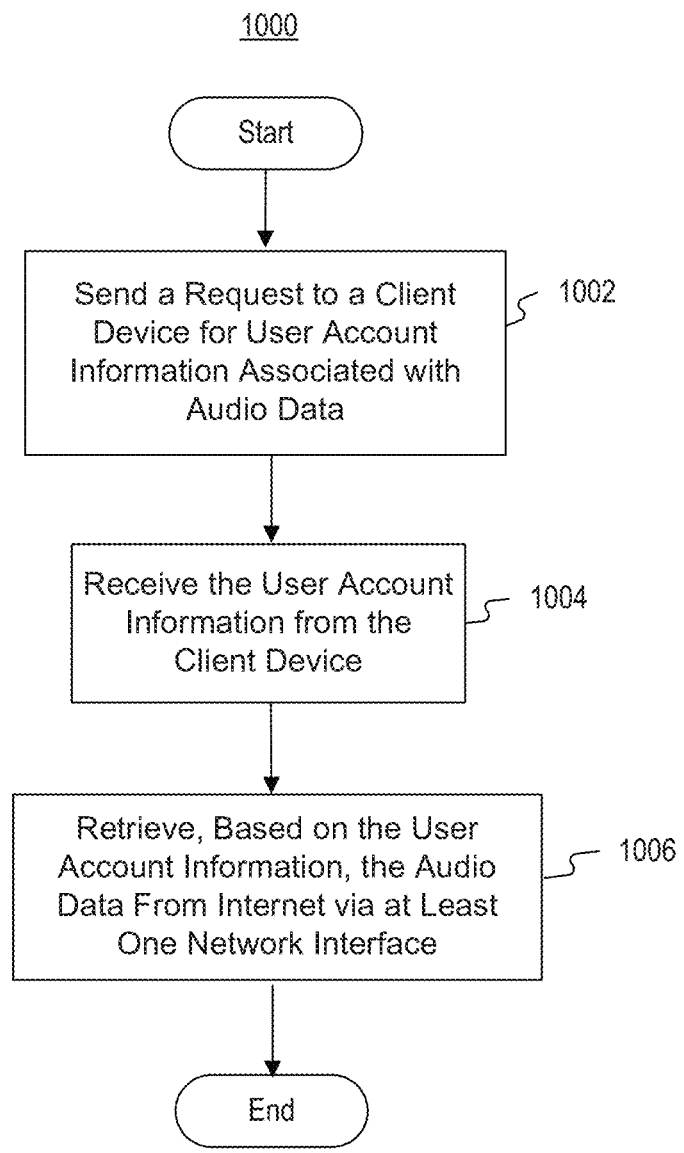
FIG. 10 is a flowchart of an exemplary method for receiving audio data by a Bluetooth hub, in accordance with an embodiment of the present disclosure.

FIG. 10 is a flowchart of an exemplary method 1000 for receiving audio data by a Bluetooth hub, in accordance with an embodiment of the present disclosure. The method 1000 may be performed by the Bluetooth hub 200 described above in connection with FIG. 2.

At step 1002, the Bluetooth hub sends a request to a client device for user account information associated with the audio data. For example, the source of the audio data may be from an Internet music service site, and the Bluetooth hub may send a request to the client device requesting the user account information for accessing the Internet music service site. As another example, the source of the audio data may be from a cloud-based network, and the Bluetooth hub may send a request to the client device requesting the user account information for accessing the cloud-based network. In some embodiments, the client device may provide a user interface for a user to enter the user account information. For example, a prompt message may be displayed on the client device prompting the user to enter the account information for the Bluetooth hub to access the Internet music service site.

At step 1004, the Bluetooth hub receives the user account information from the client device. The Bluetooth hub may store the received user account information such that it may use the stored information to access the Internet music service site in future.

At step 1006, the Bluetooth hub retrieves, based on the user account information, the audio data from Internet via at least one network interface. After the audio data is retrieved, the Bluetooth hub may perform steps 906 and 908 described above in connection with FIG. 9 so as to provide the audio data to Bluetooth audio devices for audio playing.

Figure 11:
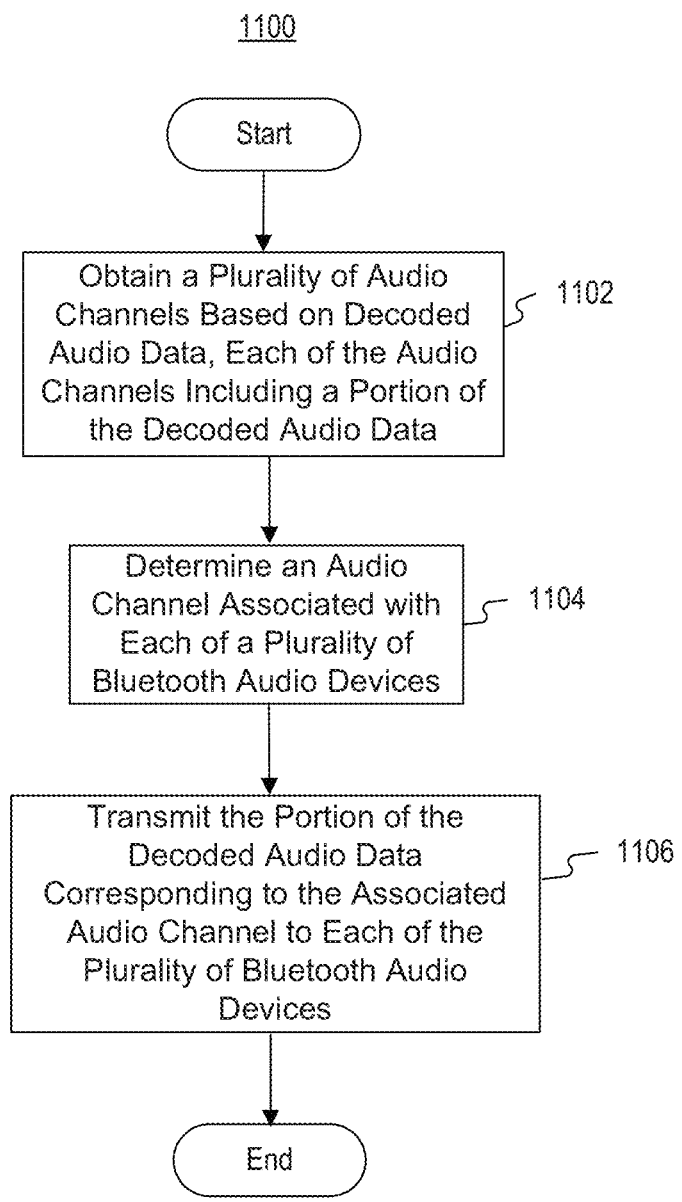
FIG. 11 is a flowchart of an exemplary method for producing a surrounding sound effect by a Bluetooth hub, in accordance with an embodiment of the present disclosure.

FIG. 11 is a flowchart of an exemplary method 1100 for producing a surrounding sound effect by a Bluetooth hub, in accordance with an embodiment of the present disclosure. The method 1100 may be performed by the Bluetooth hub 200 described above in connection with FIG. 2.

At step 1102, the Bluetooth hub obtains a plurality of audio channels based on decoded audio data, where each of the audio channels includes a portion of the decoded audio data. For example, the Bluetooth hub may split the decoded audio data into multiple audio channels, and each of the audio channels includes different portion of the decoded audio data.

At step 1104, the Bluetooth hub determines an audio channel associated with each of the plurality of Bluetooth audio devices. For example, the Bluetooth hub may determine the audio channels associated with the Bluetooth audio devices based on the locations of the Bluetooth audio devices. In some implementations, the Bluetooth audio devices may be placed at different corners of an indoor area, and the Bluetooth hub may determine the audio channels associated with the Bluetooth audio devices based on the positions of the Bluetooth audio devices in the indoor area.

At step 1106, the Bluetooth hub transmits the portion of the decoded audio data corresponding to the associated audio channel to each of the plurality of Bluetooth audio devices. Thus, each of the Bluetooth audio devices receives audio data corresponding to a particular audio channel, and when the Bluetooth audio devices play simultaneously, a surrounding sound effect may be produced.

The specification has described methods, devices, and systems for Bluetooth audio transmission. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

What is claimed is:

1. A device for providing audio data to a plurality of Bluetooth audio devices, comprising:
   one or more Bluetooth transceivers for communicating with the plurality of Bluetooth audio devices;
   at least one network interface;
   one or more processors; and
   a memory for storing instructions executable by the one or more processors, wherein the one or more processors are configured to:
      receive a user input from a client device, wherein the user input identifies the plurality of Bluetooth audio devices for playing a first audio data and a second audio data;
      receive the first and second audio data from one or more sources different from the client device via the at least one network interface based at least on the received user input, wherein the first audio data is received from a first source different from the client device, the second audio data is received from a second source different from the client device, wherein each of the first and second sources is a network site, and wherein the first source is different from the second source;
      decode the first and second audio data for audio playing;
      determine a plurality of audio channels associated with the first audio data based on locations of the plurality of Bluetooth audio devices;
      transmit the first decoded audio data to one or more of the plurality of Bluetooth audio devices via the one or more Bluetooth transceivers, in response to the received user input and based on the determined plurality of audio channels; and
      transmit the second decoded audio data to one of the plurality of Bluetooth audio devices at a different location from those of the one or more of the plurality of Bluetooth audio devices receiving the first audio data, in response to the received user input, wherein the one of the plurality of Bluetooth audio devices receiving the second decoded audio data is different from the one or more of the plurality of Bluetooth audio devices receiving the first decoded audio data;
      wherein the user input further identifies an audio playing mode associated with the first and second audio data, and wherein one or more processors are further configured to transmit the first and second decoded audio data to the plurality of Bluetooth audio devices based on the audio playing mode; and
      wherein the audio playing mode is a sleep mode, and wherein one or more processors are further configured to cause a volume of each of the plurality of Bluetooth audio devices to decrease gradually.

2. The device of claim 1, wherein the source includes at least one of Bluetooth enabled device, a remote cloud-based network system, or the Internet.

3. The device of claim 1, wherein the user input further identifies a theme associated with the first and second audio data, and wherein one or more processors are further configured to adjust, based on the theme, a light intensity of a plurality of Bluetooth lighting devices via the one or more Bluetooth transceivers.

4. The device of claim 1, wherein the one or more processors are further configured to:
   obtain a plurality of audio channels based on the first and second decoded audio data, each of the audio channels including a portion of the first and second decoded audio data;
   determine an audio channel associated with each of the plurality of Bluetooth audio devices; and
   transmit the portion of the first and second decoded audio data corresponding to the associated audio channel to each of the plurality of Bluetooth audio devices.

5. The device of claim 1, wherein the one or more processors are further configured to receive the first and second audio data from a client device via the one or more Bluetooth transceivers.

6. The device of claim 1, wherein the one or more processors are further configured to:
   send a request to a client device for user account information associated with the first and second audio data;
   receive the user account information from the client device; and
   retrieve, based on the user account information, the first and second audio data from Internet via the at least one network interface.

7. A method for providing audio data to a plurality of Bluetooth audio devices, comprising:

receiving a user input from a client device, wherein the user input identifies the plurality of Bluetooth audio devices for playing a first audio data and a second audio data;

receiving the first and second data from one or more sources different from the client device via at least one network interface based at least on the received user input, wherein the first audio data is received from a first source different from the client device, the second audio data is received from a second source different from the client device, wherein each of the first and second sources is a network site, and wherein the first source is different from the second source;

decoding the first and second audio data for audio playing;

determining a plurality of audio channels associated with the first audio data based on locations of the plurality of Bluetooth audio devices;

transmitting the decoded first audio data to the one or more of the plurality of Bluetooth audio devices via one or more Bluetooth transceivers, in response to the received user input and based the determined plurality of audio channels; and simultaneously transmitting the decoded second audio data to one of the plurality of Bluetooth audio devices at a different location from those of the one or more of the plurality of Bluetooth audio devices receiving the first audio data, in response to the received user input, wherein the one of the plurality of Bluetooth audio devices receiving the decoded second audio is different from the one or more of the plurality Bluetooth audio device receiving the first decoded audio data;

wherein the user input further identifies an audio playing mode associated with the first and second audio data, and the first and second decoded audio data is transmitted to the plurality of Bluetooth audio devices based on the audio playing mode; and wherein the audio playing mode is a sleep mode, the method further comprising: causing a volume of each of the plurality of Bluetooth audio devices to decrease gradually.

8. The method of claim 7, wherein the source includes at least one of a Bluetooth-enabled device, a remote cloud-based network system, or the Internet.

9. The method of claim 7, wherein the user input further identifies a theme associated with the first and second audio data, the method further comprising:

adjusting, based on the theme, a light intensity of a plurality of Bluetooth lighting devices via the one or more Bluetooth transceivers.

10. The method of claim 7, further comprising:

obtaining a plurality of audio channels based on the first and second decoded audio data, each of the audio channels including a portion of the first and second decoded audio data;

determining an audio channel associated with each of the plurality of Bluetooth audio devices; and transmitting the portion of the first and second decoded audio data corresponding to the associated audio channel to each of the plurality of Bluetooth audio devices.

11. The method of claim 7, further comprising receiving the first and second audio data from a client device via the one or more Bluetooth transceivers.

12. The method of claim 7, further comprising:

sending a request to a client device for user account information associated with the first and second audio data;

receiving the user account information from the client device; and retrieving, based on the user account information, the first and second audio data from Internet via the at least one network interface.

13. A device for providing audio data to a plurality of Bluetooth audio devices, comprising:

one or more Bluetooth transceivers for communication with the plurality of Bluetooth audio devices;

at least one network interface;

one or more processors; and a memory for storing instructions executable by the one or more processors, wherein the one or more processors are configured to:

receive a user input from a client device, wherein the user input identifies the plurality of Bluetooth audio devices for playing a first audio data and a second audio data;

receive the first and second audio data from one or more sources different from the client device via the at least one network interface based at least on the received user input, wherein the first audio data is received from a fist source different from the client device, the second audio data is received from a second source different from the client device, wherein each of the first and second sources is a network site, and wherein the first source is different from the second source;

decode the first and second audio data for audio playing;

determine a plurality of audio channels associated with the first audio data based on locations of the plurality of Bluetooth audio devices;

transmit the first decoded audio data to one or more of the plurality of Bluetooth audio devices via the one or more Bluetooth transceivers, in response to the received user input and based on the determined plurality of audio channels; and transmit the second decoded audio data to one of the plurality of Bluetooth audio devices at a different location from those of the one or more of the plurality of Bluetooth audio devices receiving the first audio data, in response to the received user input, wherein the one of the plurality of Bluetooth audio devices receiving the second decoded audio data is different from the one or more of the plurality of Bluetooth audio devices receiving the first decoded audio data;

wherein the user input further identifies an audio playing mode associated with the first and second audio data, and wherein one or more processors are further configured to transmit the first and second decoded audio data to the plurality of Bluetooth audio devices based on the audio playing mode; and wherein the audio playing mode is a wake-up mode, and wherein one or more processors are further configured to cause a volume of each of the plurality of Bluetooth audio devices to increase gradually.

14. A method for providing audio data to a plurality of Bluetooth audio devices, comprising:

receiving a user input from a client device, wherein the user input identifies the plurality of Bluetooth audio devices for playing a first audio data and a second audio data;

receiving the first and second audio data from one or more sources different from the client device via at least one network interface based at least on the received user input, wherein the first audio data is received form a first source different from the client device, the second audio data is received from a second source different from the client device, wherein each of the first and second sources is a network site, and wherein the first source is different from the second source;

decoding the first and second audio data for audio playing;

determining a plurality of audio channels associated with the first audio data based on locations of the plurality of Bluetooth audio devices;

transmitting the decoded first audio data to one or more of the plurality of Bluetooth audio devices via one or more Bluetooth transceivers, in response to the received user input and based the determined plurality of audio channels; and simultaneously transmitting the decoded second audio data to one of the plurality of Bluetooth audio devices at a different location from those of the one or more of the plurality of Bluetooth audio devices receiving the first audio data, in response to the received user input, wherein the one of the plurality of Bluetooth audio devices receiving the decoded second audio is different from the one or more of the plurality Bluetooth audio device receiving the first decoded audio data;

wherein the user input further identifies an audio playing mode associated with the first and second audio data, and the first and second decoded audio data is transmitted to the plurality of Bluetooth audio devices based on the audio playing mode; and wherein the audio playing mode is a wake-up mode, the method further comprising: causing a volume of each of the plurality of Bluetooth audio devices to increase gradually.

* * * * *